(12) United States Patent
Kim et al.

(10) Patent No.: US 10,883,840 B2
(45) Date of Patent: Jan. 5, 2021

(54) SYSTEM AND METHOD FOR LOCALIZING VEHICLE

(71) Applicants: Hyundai Motor Company, Seoul (KR); Kia Motors Corporation, Seoul (KR)

(72) Inventors: Hyo Jeong Kim, Seoul (KR); Sang Gu Kwon, Suwon-si (KR)

(73) Assignees: Hyundai Motor Company, Seoul (KR); Kia Motors Cornoration, Seoul (KR)

( * ) Notice: Subject to any disclaimer, the term of this patent is extended or adjusted under 35 U.S.C. 154(b) by 0 days.

(21) Appl. No.: 16/530,021

(22) Filed: Aug. 2, 2019

(65) Prior Publication Data

US 2020/0158518 A1  May 21, 2020

(30) Foreign Application Priority Data

Nov. 16, 2018  (KR) ........................ 10-2018-0142012

(51) Int. Cl.
*G01C 21/32* (2006.01)
*G01S 19/48* (2010.01)

(52) U.S. Cl.
CPC .............. *G01C 21/32* (2013.01); *G01S 19/48* (2013.01)

(58) Field of Classification Search
CPC ............................ B62D 15/025; G08G 1/166

USPC .... 348/218.1, 14.01; 455/456.6, 418, 569.2; 701/438, 454

See application file for complete search history.

(56) References Cited

U.S. PATENT DOCUMENTS

| | | | |
|---|---|---|---|
| 6,650,284 B1 | 11/2003 | Mannings et al. | |
| 2010/0332135 A1 | 12/2010 | Toda | |
| 2016/0076894 A1* | 3/2016 | Choi | B60W 30/00 |
| | | | 701/461 |
| 2018/0292543 A1* | 10/2018 | McFarland | G01S 19/51 |

FOREIGN PATENT DOCUMENTS

| | | |
|---|---|---|
| JP | 2013088208 A | 5/2013 |
| KR | 20050010613 A | 1/2005 |
| KR | 20060055920 A | 5/2006 |
| KR | 20110125880 A | 11/2011 |
| KR | 20130002086 A | 1/2013 |

* cited by examiner

*Primary Examiner* — Kiet M Doan
(74) *Attorney, Agent, or Firm* — Slater Matsil, LLP (57) ABSTRACT

The present disclosure relates to a system and a method for localizing a vehicle. A vehicle terminal acquires location information of a vehicle and transmits the acquired location information to the mobile terminal, then determines whether the vehicle enters a poor reception quality zone where a reception of a satellite signal is poor. Then, the vehicle terminal, when the vehicle enters the poor reception quality zone, receives map information of the poor reception quality zone transmitted from the mobile terminal, and corrects a current location of the vehicle using the map information of the poor reception quality zone.

15 Claims, 10 Drawing Sheets

(PRIOR ART)

(PRESENT DISCLOSURE)

FIG. 7

(PRIOR ART)

(PRESENT DISCLOSURE)

SYSTEM AND METHOD FOR LOCALIZING VEHICLE

CROSS-REFERENCE TO RELATED APPLICATIONS

This application claims priority to Korean Patent Application No. 10-2018-0142012, filed in the Korean Intellectual Property Office on Nov. 16, 2018, which application is hereby incorporated herein by reference.

TECHNICAL FIELD

The present disclosure relates to a system and a method for localizing a vehicle.

BACKGROUND

An Emergency Call (eCall) system helps a driver to be rescued promptly from a traffic accident by automatically or manually reporting an accident and requesting a rescue in a vehicle to help speed up the rescue even when the driver is unconscious or cannot make a call. The eCall system is mounted in the vehicle, and detects a traffic accident occurrence through an air bag system, a vehicle sensor, and the like. When the traffic accident is detected, the eCall system transmits traffic accident information including an accident location, a vehicle type, a traveling direction, and the like to a Public Safety Answering Point (PSAP). The PSAP identifies the traffic accident information received from the eCall system, and transmits accident-related information to the nearest rescue facility to the accident location.

The eCall system calculates a location coordinate of the accident location using a satellite signal transmitted from a Global Navigation Satellite System (GNSS) satellite. The eCall system does not have map information on its own. Therefore, it is difficult to determine an exact vehicle location in a region where a reception sensitivity of the satellite signal is poor, such as a tunnel, an underpass, or the like.

Further, the eCall system relies on a Dead Reckoning (DR) value of an in-vehicle DR system in the satellite signal poor reception quality region to determine the vehicle's current location. However, the longer the time that the satellite signal is not received, the more the error of the DR value increases. Therefore, when the accident occurs in the satellite signal poor reception quality region such as the tunnel, the eCall system inevitably provides an inaccurate accident location.

SUMMARY

The present disclosure relates to a system and a method for localizing a vehicle, which in various embodiments are capable of measuring a vehicle location in a poor reception quality region where it is difficult to receive a satellite signal.

Embodiments of the present disclosure can solve the above-mentioned problems occurring in the prior art while advantages achieved by the prior art are maintained intact.

An aspect of the present disclosure provides a system and a method for localizing a vehicle for measuring a vehicle location using map information in a mobile terminal in a poor reception quality region where a satellite signal is difficult to be received.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a vehicle localization system includes a mobile terminal configured to provide map information. A vehicle terminal is configured to calculate a current location of the vehicle using the map information when a vehicle enters a poor reception quality zone where a reception of a satellite signal is poor.

In one embodiment, the vehicle terminal includes a communication module configured to communicate with the mobile terminal, a location measurement module configured to measure a vehicle location using the satellite signal, a dead reckoning module configured to estimate the vehicle location based on a travel distance and a heading angle of the vehicle, and a processor configured to receive map information of the poor reception quality zone from the mobile terminal, and to correct the current location of the vehicle.

In one embodiment, the map information of the poor reception quality zone includes a road attribute, a starting location, an ending location, and a road gradient of the poor reception quality zone.

In one embodiment, the processor is configured to determine the poor reception quality zone as a reception-disturbance region or a shadow region based on the road attribute.

In one embodiment, when the poor reception quality zone is the reception-disturbance region, the processor is configured to change the current location of the vehicle into a location map-matched by the mobile terminal, and when the poor reception quality zone is the shadow region, the processor corrects the current location of the vehicle based on estimated location-related error information calculated by the mobile terminal.

In one embodiment, the mobile terminal is configured to map-match a measured location and an estimated location included in the vehicle location information transmitted from the vehicle terminal onto an electronic map to select a current road-zone matching the poor reception quality zone where the vehicle is located.

In one embodiment, the mobile terminal is configured to extract map information of the selected current road-zone from the electronic map, and to transmit the map information of the selected current road-zone to the vehicle terminal.

According to an aspect of the present disclosure, a vehicle localization method includes acquiring, by a vehicle terminal, location information of a vehicle and transmitting the acquired location information to a mobile terminal. The vehicle terminal determines whether the vehicle enters a poor reception quality zone where a reception of a satellite signal is poor. When the vehicle has entered the poor reception quality zone, the vehicle terminal receives map information of the poor reception quality zone transmitted from the mobile terminal and corrects a current location of the vehicle using the map information of the poor reception quality zone.

In one embodiment, the receiving of the map information of the poor reception quality zone includes map-matching, by the mobile terminal, a measured location and an estimated location included in the location information onto an electronic map, selecting, by the mobile terminal, a current road-zone matched with the poor reception quality zone where the vehicle is located, based on the map-matched location information, extracting, by the mobile terminal, map information of the current road-zone from the electronic map, and transmitting, by the mobile terminal, the extracted map information of the current road-zone to the vehicle terminal.

In one embodiment, the map-matching onto the electronic map includes calculating, by the mobile terminal, an error between the estimated location and the map-matched estimated location.

In one embodiment, the mobile terminal transmits the calculated error information together with the map information of the current road-zone.

In one embodiment, the correcting of the current location of the vehicle includes correcting, by the vehicle terminal, the current location of the vehicle using the calculated error information.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF ILLUSTRATIVE EMBODIMENTS

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present disclosure relates to a vehicle localization system that measures a current location of a vehicle using Global Navigation Satellite System (GNSS) and Dead Reckoning (DR) techniques. The present disclosure proposes a technique, when a navigation system is not provided, for measuring a vehicle location using an electronic map (map information, map data) in a mobile terminal in a poor reception quality zone where it is difficult to receive a GNSS satellite signal.

The global satellite navigation system (GNSS) is a global radio navigation system based on a satellite. Further, the GNSS is a system in which a user with a module capable of receiving the signal transmitted from the satellite may determine a location thereof regardless of a weather condition anytime and anywhere. The global satellite navigation system GNSS is represented by a Global Positioning System (GPS) of US, Global orbiting Navigation Satellite System (GLONASS) of Russia, Galileo of Europe, a Beidou of China, Quasi-Zenith Satellite System (QZSS) of Japan, Indian Regional Navigation Satellite System (IRNSS) of India, and the like.

Figure 1:
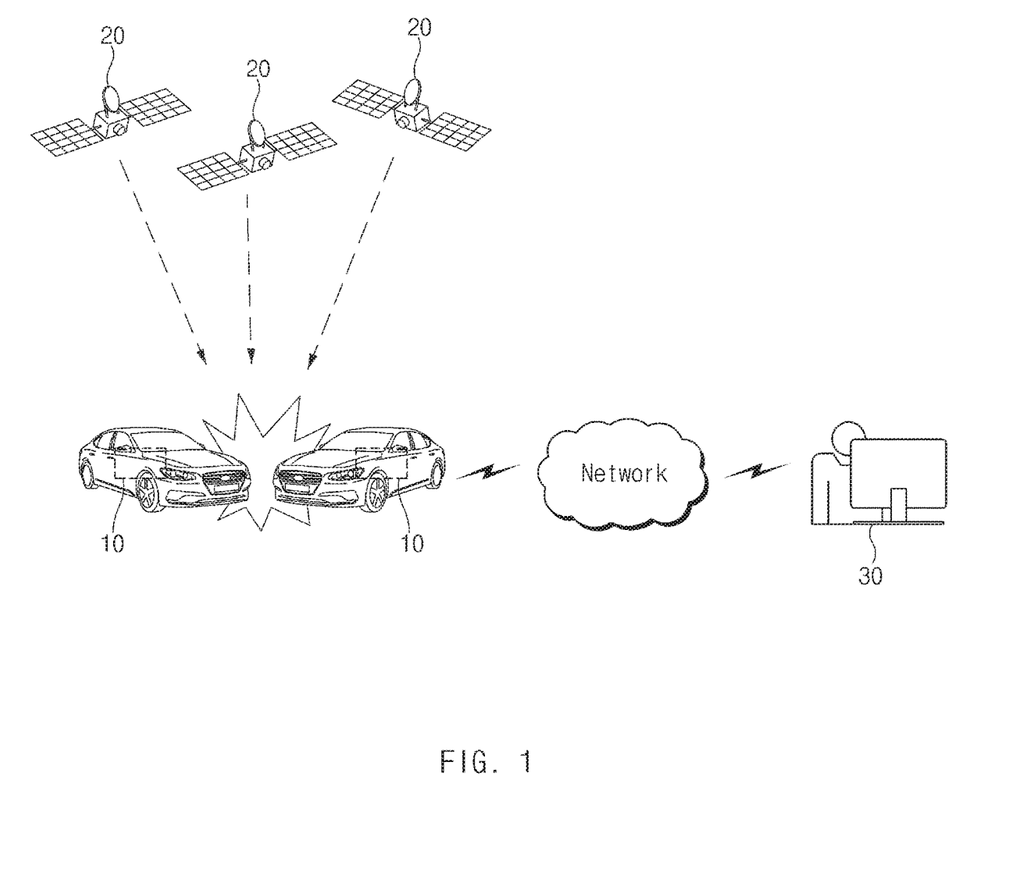
FIG. 1 is a diagram illustrating an eCall service system according to the present disclosure.
Figure 2:
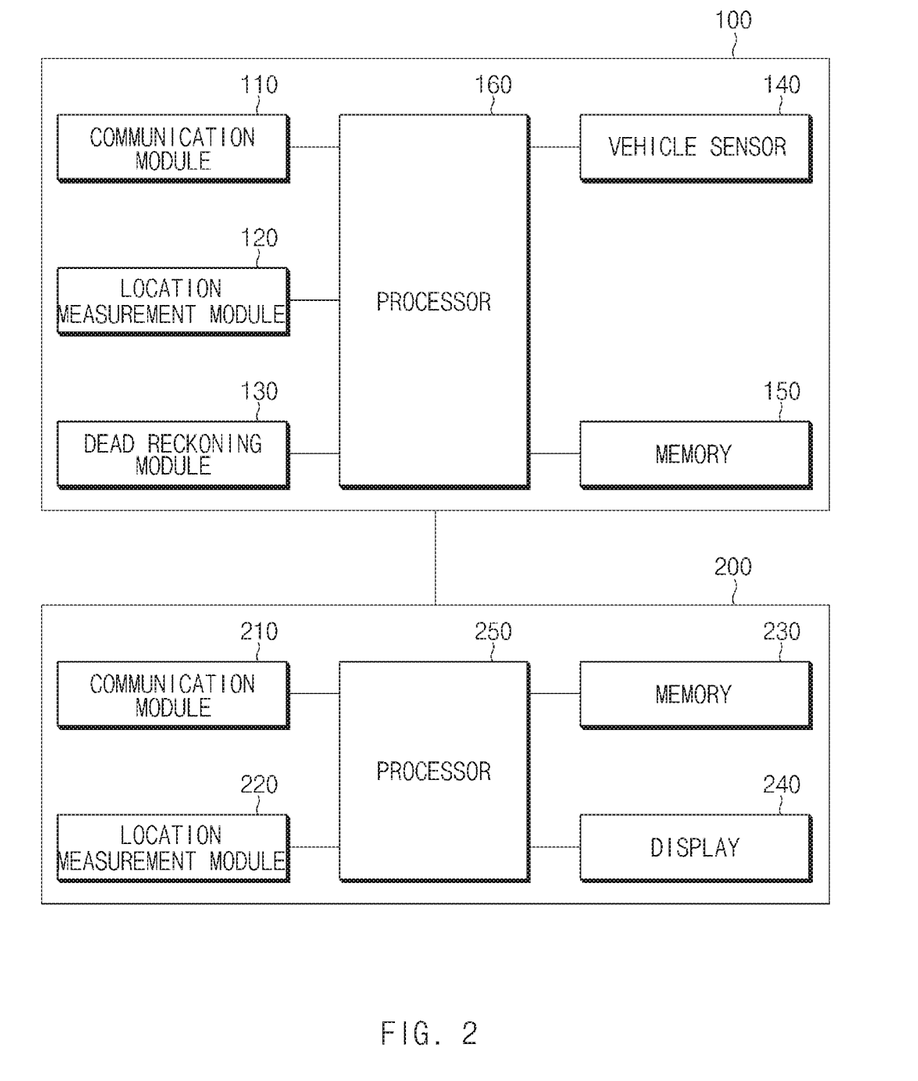
FIG. 2 is a block diagram illustrating a vehicle localization system according to an embodiment of the present disclosure.
Figure 3:
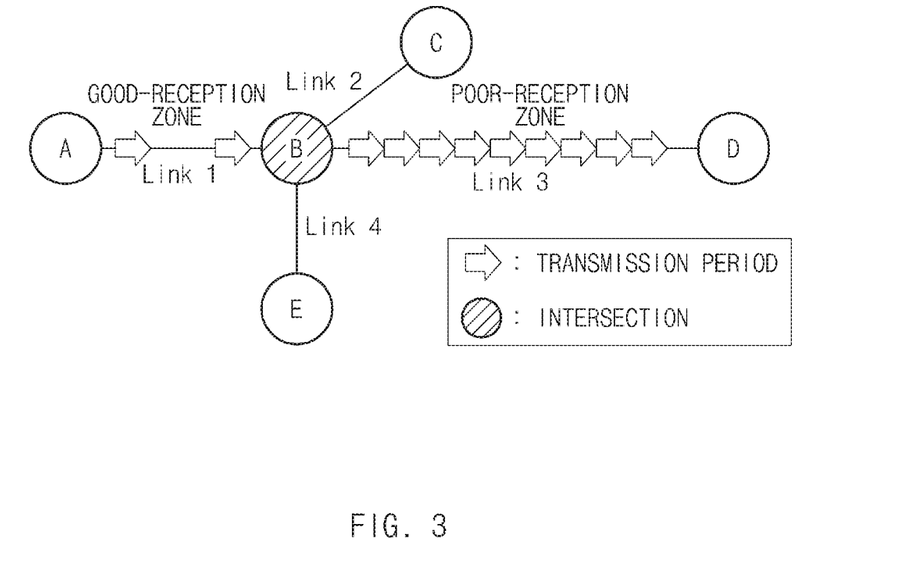
FIG. 3 is a diagram illustrating a location information transmission period of a vehicle terminal according to the present disclosure.
Figure 4:
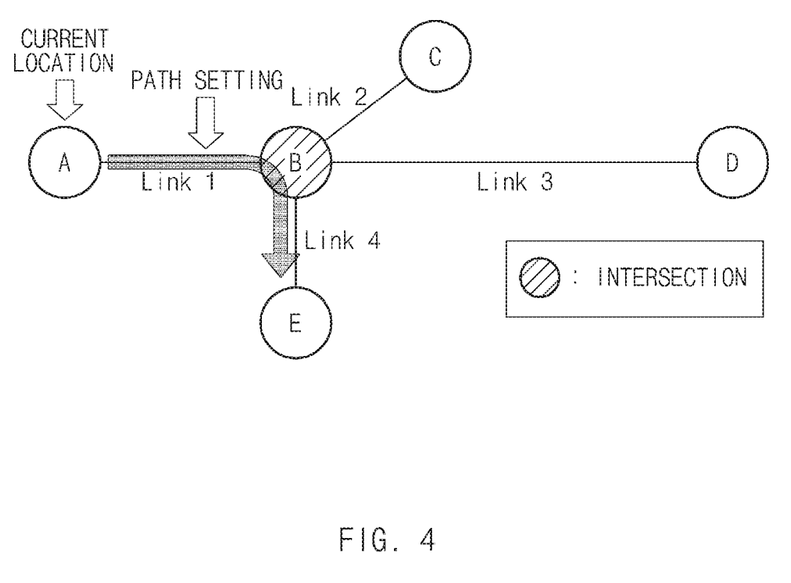
FIG. 4 and FIG. 5 are diagrams illustrating a vehicle traveling road-zone selection method according to the present disclosure.
Figure 5:
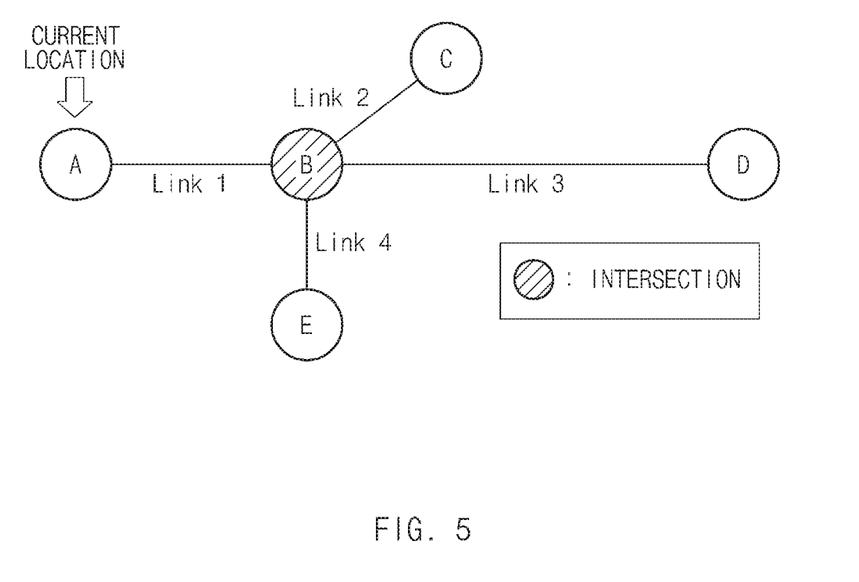

FIG. 1 is a diagram illustrating an eCall service system according to the present disclosure. FIG. 2 is a block diagram illustrating a vehicle localization system according to an embodiment of the present disclosure. FIG. 3 is a diagram illustrating a location information transmission period of a vehicle terminal according to the present disclosure. FIG. 4 and FIG. 5 are diagrams illustrating a vehicle traveling road-zone selection method according to the present disclosure.

With reference to FIG. 1, an Emergency Call (eCall) service system includes a vehicle localization system 10, a Global Navigation Satellite System (GNSS) satellite 20, and a control center 30. In this connection, the vehicle localization system 10 refers to an eCall system capable of rescue calling (eCalling) the control center 30 in an event of a vehicle accident.

The vehicle localization system 10 is mounted in a vehicle, and detects the vehicle accident through an impact sensor and/or an air bag control unit (ACU) when the vehicle accident occurs. For example, the vehicle localization system 10 recognizes an emergency situation when an impact intensity (level) measured by the impact sensor exceeds a predetermined reference intensity (threshold).

Upon detecting the emergency situation such as the vehicle accident, and the like, the vehicle localization system 10 measures a vehicle's current location, that is, an accident location (accident location coordinate) using a signal from the GNSS satellite 20. The vehicle localization system 10 transmits a rescue request signal including the accident location, the accident occurrence time, and the like to the control center 30. In addition, the vehicle localization system 10 may request an audio connection (phone connection) to the control center 30.

The control center 30 is a Public Safety Answering Point (PSAP), which receives the rescue request signal transmitted from the vehicle localization system 10. Upon receiving the rescue request, the control center 30 confirms the accident location, and requests an emergency response to a rescue facility close to the accident location (e.g. a fire station, a police station, a road traffic authority, an insurance company, and the like). When requesting the emergency response, the control center 30 also provides accident-related information to the rescue facility.

FIG. 2 is a block diagram illustrating a vehicle localization system according to an embodiment of the present disclosure.

With reference to FIG. 2, the vehicle localization system 10 includes a vehicle terminal 100 and a mobile terminal 200. In this connection, the vehicle terminal 100 may be implemented as a GNSS/DR (Dead Reckoning) module embedded in the eCall system. The mobile terminal 200 may be implemented as a smart phone, a tablet, a personal digital assistant (PDA), a portable multimedia player (PMP), a notebook computer, or the like.

The vehicle terminal 100 includes a communication module no, a location measurement module 120, a dead reckoning module 130, a vehicle sensor 140, a memory 150, and a processor 160.

The communication module no performs a wired and/or wireless communication. As the wireless communication technology, a wireless internet technology such as a wireless LAN (WLAN) (WiFi), a Wireless broadband (Wibro), a World Interoperability for Microwave Access (Wimax), and the like, a short-range communication technology such as a Bluetooth, a Near Field Communication (NFC), a Radio Frequency Identification (RFID), an Infrared Data Association (IrDA), a ZigBee, and the like and/or a mobile communication technology such as a Code Division Multiple Access (CDMA), a Global System for Mobile communication (GSM), a Long Term Evolution (LTE), a LTE-Advanced, and the like may be used. As the wired communication technology, a serial communication technology such as a universal Serial Bus (USB), and the like may be used.

The location measurement module 120 measures the current location of the vehicle. The location measurement module 120 receives a signal transmitted from the GNSS satellite via a GNSS receiver (not shown), and calculates the current location of the vehicle using the received satellite signal. The location measurement module 120 calculates a distance between the satellite and the location measurement module 120 using a time difference between the time the satellite transmitted the signal and the time the satellite signal was received. The location measurement module 120 calculates the current location of the vehicle using the calculated distance between the satellite and the location measurement module 120 and satellite location information contained in the satellite signal.

The dead reckoning module 130 estimates the current location of the vehicle using a dead reckoning (DR) technology. The dead reckoning module 130 calculates a travel distance and a direction (heading angle) of the vehicle from a starting location, which is a reference position, using a sensor value measured through a gyro sensor, a speed sensor, an acceleration sensor, and the like. The dead reckoning module 130 estimates the vehicle location by calculating a relative location movement value with reference to the starting location. The dead reckoning module 130 transmits the estimated vehicle location, that is, an estimated location (DR information) to the processor 160.

The vehicle sensors 140 obtain vehicle information from one or more sensors and/or an Electric Control Unit (ECU) mounted in the vehicle. The one or more sensors may include the impact sensor, the speed sensor, a distance sensor, the gyro sensor and the acceleration sensor, and the like. The vehicle sensors 140 may acquire the vehicle information (e.g. an air bag expansion, whether a door is opened or closed, and the like) from the Electric Control Unit such as an air bag system, a vehicle door system, an ESC (Electronic Stability Control), a TCS (Traction Control System), and an ABS(Antilock Brake System), and the like via a vehicle network (In-Vehicle Network). A vehicle network is implemented as a Controller Area Network (CAN), a Media Oriented Systems Transport (MOST) network, a Local Interconnect Network (LIN), X-by-Wire (Flexray), or the like.

The memory 150 may store a program for an operation of the processor 160, and may temporarily store data to be input/output. The memory 150 may store an emergency rescue request algorithm, a current location calculation algorithm, and the like. The memory 150 may store the measured location and the estimated location (dead reckoning position) output from the location measurement module 120 and the dead reckoning module 130.

The memory 150 may be implemented as at least one of storage media (recording media) such as a flash memory, a hard disk, an SD card (Secure Digital Card), a random access memory (RAM), a static random access memory (SRAM), a read only memory (ROM), a programmable read only memory (PROM), an electrically erasable and programmable ROM (EEPROM), an erasable and programmable ROM (EPROM), a register, a removable disk, a web storage, and the like.

The processor 160 controls an overall operation of the vehicle terminal 100. This processor 160 may be implemented at least one of an Application Specific Integrated Circuit (ASIC), a Digital Signal Processor (DSP), a Programmable Logic Devices (PLD), Field Programmable Gate Arrays (FPGAs), a Central Processing Unit (CPU), a micro controller, and microprocessors.

The processor 160 performs a communication link for a data communication with the mobile terminal 200 located in the vehicle. For example, upon detecting the mobile terminal 200 in the vehicle, the processor 160 of the vehicle terminal 100 establishes a Bluetooth connection with the mobile terminal 200.

The processor 160 transmits the measured location and the estimated location acquired through the location measurement module 120 and the dead reckoning module 130 to the mobile terminal 200 via the communication module no. The processor 160 transmits location information including the measured location and the estimated location to the mobile terminal 200 based on a predetermined transmission period.

In addition, the processor 160 continuously checks a receiving sensitivity of the GNSS satellite signal through the location measurement module 120 to determine whether or not the vehicle is entered in a poor reception quality zone. The processor 160 determines that the vehicle has entered the poor reception quality zone when the receiving sensitivity of the satellite signal is below a threshold value. In this connection, the poor reception quality zone is classified into a reception-disturbance region (hereinafter referred to as a "first zone") that is difficult to receive the satellite signal due to a building, a multi-path, and the like, and a shadow region (hereinafter referred to as a "second zone") that is not able to receive the satellite signal such as a tunnel, an underpass, and the like.

The processor 160 receives correction information transmitted from the mobile terminal 200 when the vehicle enters the poor reception quality zone. The correction information includes map-matched location information, map information of a road-zone (map information of the poor reception quality zone), estimated location-related error (ΔDR) information, and path information (a path to a destination).

The processor 160 determines a road attribute of the road-zone (link) on which the vehicle is currently traveling based on the map information of the poor reception quality zone included in the correction information provided from the mobile terminal 200. The processor 160 checks the road attribute (the underpass, the tunnel, a building parking lot, and the like) included in the map information to determine a cause of the poor reception of the satellite signal. That is, the processor 160 checks whether the road-zone on which the vehicle is traveling belongs to the first zone or the second zone.

When the vehicle enters the first zone, the processor 160 corrects the current location of the vehicle with the map-matched location information included in the correction information received from the mobile terminal 200. When the vehicle enters the second zone, the processor 160 corrects the current location of the vehicle with the map information of the poor reception quality zone and the estimated location-related error information received from the mobile terminal 200. That is, the processor 160 corrects the estimated location by applying the estimated location-related error information to the existing estimated location (DR). The processor 160 calculates the estimated location using an entrance location (starting location) and an exit location (end location) of the second zone, a remaining distance to the exit, a road gradient, and the like based on the corrected estimation location.

Upon detecting the occurrence of the vehicle accident through the vehicle sensor 140, the processor 160 transmits most recently measured location information to the control center 30. For example, when the impact intensity measured by the impact sensor is equal to or above the predetermined reference intensity, the processor 160 detects that the accident has occurred, and requests the rescue along with the accident location information.

When the emergency situation occurs in the poor reception quality zone, the processor 160 transmits the most recently updated vehicle location information to the control center 30 using the correction information provided from the mobile terminal 200.

The mobile terminal 200 includes a communication module 210, a location measurement module 220, a memory 230, a display 240, and a processor 250.

The communication module 210 supports the wired and/or wireless communication with the vehicle terminal 100. The communication module 210 may perform a data (including audio data) communication between the mobile terminal 200 and the control center 30. As the wireless communication technology, the wireless internet technology such as the WiFi, the Wibro, the Wimax, and the like, the short-range communication technology such as the Bluetooth, the NFC, the RFID, the Infrared Data Association, the ZigBee, and the like and/or the mobile communication technology such as the CDMA, the GSM, the LTE, the LTE-Advanced, and the like may be used. As the wired communication technology, the serial communication technology such as the USB, and the like may be used.

The location measurement module 220 measures the current location of the mobile terminal 200. The location measurement module 220 receives the satellite signal transmitted from the GNSS satellite through the GNSS receiver (not shown), and calculates the current location of the mobile terminal 200 using the received satellite signal.

The memory 230 stores software programmed to allow the processor 250 to perform a predetermined operation. The memory 230 may store a navigation program, an electronic map (map information), and a map-matching algorithm, and the like.

The memory 230 may be implemented as at least one of the storage media (recording media) such as the flash memory, the hard disk, the SD card, the RAM, the SRAM, the ROM, the PROM, the EEPROM, the EPROM, the register, the removable disk, the web storage, and the like.

The display 240 outputs a status and a result depending on the operation of the processor 250. The display 240 may be implemented as at least one of display means such as a liquid crystal display (LCD), a thin film transistor-liquid crystal display (TFT LCD), an organic light-emitting diode (OLED) display, a flexible display, a 3-dimensional (3D) display, a transparent display, a head-up display (HUD), a touch screen, and the like.

The display 240 may include an audio output module such as a speaker capable of outputting the audio data. For example, the display 240 may display navigation information based on an electronic map, and may also output an audio signal through the speaker.

Further, the display 240 may be implemented as a touch screen combined with a touch sensor, and used as an input device as well as an output device. As the touch sensor, a touch film, a touch pad, and the like may be used.

The processor 250 controls an overall operation of the mobile terminal 200. This processor 250 may be implemented as at least one of the ASIC, the DSP, the PLD, the FPGA, the CPU, the micro controller, and the microprocessor.

The processor 250 executes the navigation program stored in the memory 230 based on a user input inputted through a user interface (not shown) such as the touch screen. The processor 250 displays the current location of the vehicle matched on the electronic map. In addition, the processor 250 sets a destination based on the user input, and searches an entire path from the vehicle's current location (starting location) to the destination. The processor 250 may transmit the searched entire path to the destination to the vehicle terminal 100. In addition, when the path to the destination is re-searched (updated), the processor 250 transmits the re-searched path to the vehicle terminal 100.

The processor 250 receives the measured location and the estimated location information transmitted from the vehicle terminal wo via the communication module 210. The received measured location and estimated location are used for calculating the current location (in this connection, the vehicle location) of the mobile terminal 200 in the poor reception quality zone where the reception of the satellite signal is poor.

The processor 250 monitors the reception sensitivity of the satellite signal through the location measurement module 220. When the reception sensitivity is below the threshold, the processor 250 determines that the mobile terminal 200 has entered the poor reception quality zone. The processor 250 varies the transmission period of the correction information depending on whether the mobile terminal 200 has entered the poor reception quality zone or not. For example, as shown in FIG. 3, when the mobile terminal 200 has entered a good-reception zone (Link 1) where the reception of the satellite signal is good, the processor 250 transmits the correction information in a 1 Hz cycle. In one example, when the mobile terminal 200 has entered the poor reception quality zone (Link 3) where the reception of the satellite signal is poor, the processor 250 transmits the correction information in a 5 Hz cycle.

When the mobile terminal 200 has entered the poor reception quality zone, the processor 250 updates the location information of the mobile terminal 200 using the estimated location information provided from the vehicle terminal 100. The processor 250 map-matches the updated location information of the mobile terminal 200 on the electronic map (map data), and reupdates the location information of the mobile terminal 200.

The processor 250 selects current traveling road-zone (hereinafter, current road-zone) and next traveling road-zone (hereinafter, next road-zone) based on the map-matched location information. In this connection, the next road-zone refers to a road-zone to which the vehicle will travel next, connected to the current road-zone. The processor 250 selects the next road-zone with different methods depending on whether the destination was set.

First, when the destination was set, the processor 250 sets the current road-zone where the vehicle is located and the next road-zone based on the entire path from the starting location to the destination. For example, as shown in FIG. 4, when the current location of the vehicle is node A, and the Link 1 and a Link 4 were set as the path to be travelled, the processor 250 selects the Link 1 as the current road-zone, and the Link 4 as the next road-zone.

Then, when the destination is not set, the processor 250 uses the electronic map to select road-zone(s) where having the same orientation as the vehicle traveling direction among road-zone(s) connected to the current road-zone where the vehicle is currently located as a candidate road-zone. The processor 250 selects one of the selected candidate road-zones as the next road-zone. The processor 250 selects a candidate road-zone closest to the vehicle as the next road-zone based on the traveling direction (heading angle) and the current location of the vehicle. With reference to FIG. 5, when the vehicle is located at the node A, and is traveling straight toward a node B, the processor 250 selects the Link 1 as the current road-zone, and a Link 2, a Link 3, and the Link 4 as the candidate road-zone in consideration of the traveling direction of the vehicle. Then, the processor 250 selects the Link 3, which is closest to the vehicle, as the next road-zone based on the traveling direction (straight line) and current location of the vehicle.

The processor 250 calculates the error (difference) between the received estimated location and the map-matched estimation location, that is, the estimated location correction value (ΔDR).

The processor 250 transmits the correction information including the map-matched vehicle location, the estimated location correction value, and the correction information including the map information of the current traveling road-zone, the next road-zone, and the like via the communication module 210 to the vehicle terminal 100. The map information includes the road attribute (the underpass, the tunnel, the building parking lot, and the like), the starting location and the end location of the road-zone (e.g., a tunnel entrance coordinate and a tunnel exit coordinate), the remaining distance to the end location (exit), the road gradient, and the like.

Figure 6:
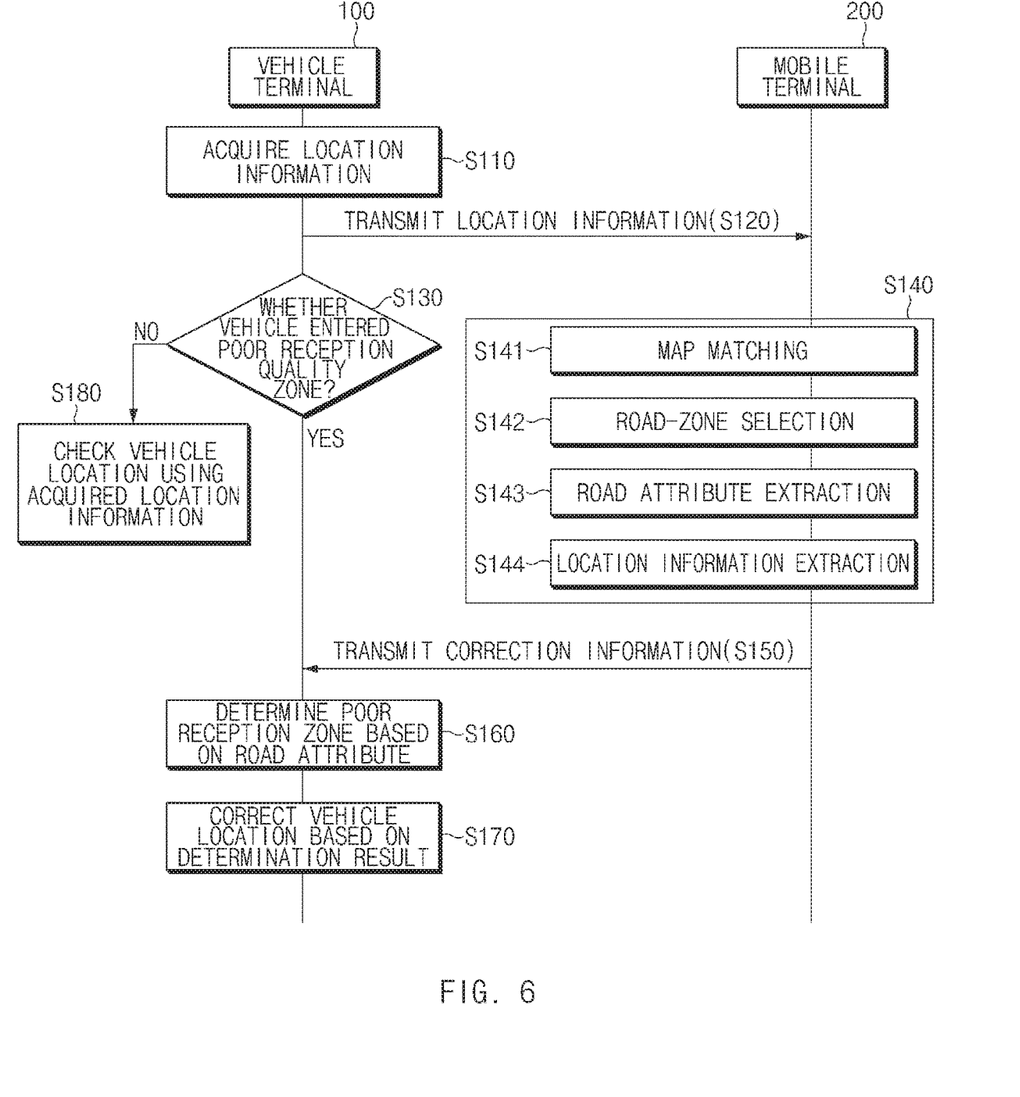
FIG. 6 is a flow chart illustrating a vehicle localization method according to an embodiment of the present disclosure.

FIG. 6 is a flow chart illustrating a vehicle localization method according to an embodiment of the present disclosure.

The vehicle terminal 100 acquires the location information of the vehicle, and transmits it to the mobile terminal 200 (S110, S120). The processor 160 of the vehicle terminal 100 obtains the measured location and estimated location of the vehicle via the location measurement module 120 and the dead reckoning module 130. The processor 160 transmits the location information including the measured location and the estimated location at a predetermined cycle via the communication module 110.

The vehicle terminal 100 determines whether the vehicle has entered the poor reception quality zone (S130). The processor 160 monitors the reception sensitivity of the satellite signal received through the GNSS receiver included in the location measurement module 120. The processor 160 determines that the vehicle has entered the poor reception quality zone when the reception sensitivity of the satellite signal is below the threshold. The vehicle terminal 100 receives the correction information provided from the mobile terminal 200 when the vehicle has entered the poor reception quality zone.

The mobile terminal 200 performs the map-matching based on the location information transmitted from the vehicle terminal 100 to extract the map information of the poor reception quality zone (S140). When extracting the map information of the poor reception quality zone, the mobile terminal 200 calculates the map-matched location information and the estimated location correction value together.

The processor 250 of the mobile terminal 200 map-matches the measured location and the estimated location included in the location information on the electronic map (S141). The processor 250 calculates the error between the received estimated location and the map-matched estimated location (estimated location correction value).

The processor 250 selects the current road-zone where the vehicle is traveling, and the next road-zone based on the map-matched location information (S142). When the destination was set, the processor 250 may select the current road-zone and the next road-zone using the path information to the destination and the map information. In one example, when the destination was not set, the processor 250 selects the current road-zone based on the map-matched location information, and selects the candidate road-zones to be connected to the current road-zone based on the traveling direction of the vehicle. The processor 250 selects one of the candidate road-zones as the next road-zone. At this time, the processor 250 selects the candidate road-zone closest to the vehicle based on the traveling direction and the location of the vehicle.

The processor 250 extracts the road attribute information of the selected road-zone from the electronic map (map data) stored in the memory 230 (S143). The road attribute information refers to the road type such as the underpass, the tunnel, an underground parking, an underground passage, and the like.

The processor 250 extracts the location information of the selected road-zone from the electronic map (S144). The location information of the road-zone includes the starting and ending locations of the road-zone, the size (width, height, and the like), the road gradient, the distance between the starting and ending locations, a trajectory coordinate (x,y,z), and the like.

The processor 250 transmits the correction information including the road-zone map information, the map-matched location information, and the estimated location-related error information to the vehicle terminal 100 (S150).

Upon detecting that the vehicle has entered the poor reception quality zone in S130, the vehicle terminal 100 distinguishes the poor reception quality zone with reference to the correction information transmitted from the mobile terminal 200 (S160). The processor 160 of the vehicle terminal 100 determines the poor reception quality zone as the first zone or the second zone based on the road attribute of the poor reception quality zone included in the correction information.

The vehicle terminal 100 corrects the vehicle location using the correction information depending on the determination result (S170). When the poor reception quality zone is the first zone (reception-disturbance region), the processor 160 updates the vehicle location into the map-matched location information in the correction information. In one example, when the poor reception quality zone is the second zone (shadow region), the processor 160 corrects the estimated location output from the dead reckoning module 130 using the estimated location-related error information. The processor 160 updates the corrected estimated location into the vehicle location.

In one example, when the vehicle has not entered the poor reception quality zone in S130, the vehicle terminal 100 checks the current location (vehicle location) of the vehicle using the acquired location information (S180).

Figure 7:
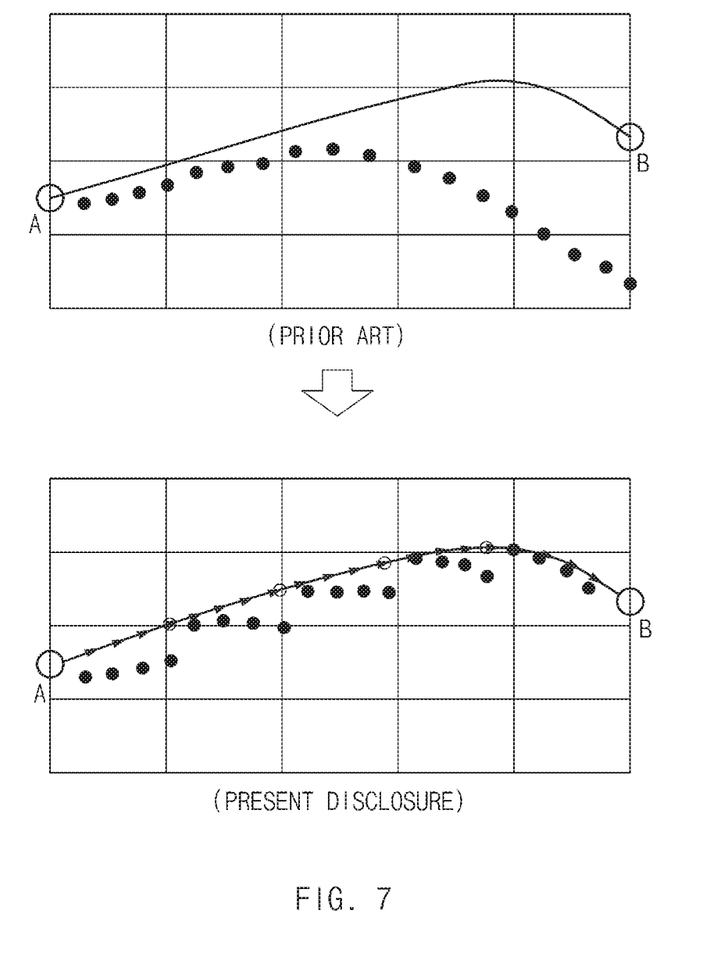
FIG. 7 and FIG. 8 are graphs showing vehicle localization results according to the present disclosure.
Figure 8:
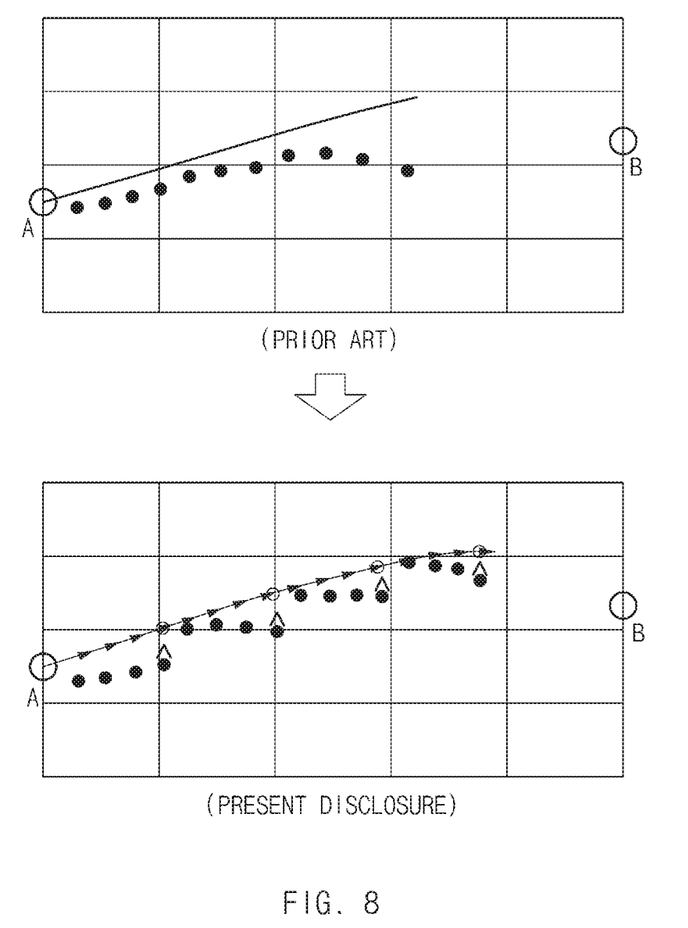

FIG. 7 and FIG. 8 are graphs showing vehicle localization results according to the present disclosure.

With reference to FIG. 7, when the vehicle travels the shadow region, conventionally, an error between a road-zone trajectory (solid line) of the shadow region and a vehicle location trajectory (dotted line) calculated by the vehicle terminal 100 increases cumulatively over time.

Upon the vehicle enters the shadow region, the vehicle localization system 10 according to the present disclosure minimizes the location-related error by correcting the vehicle location at a predetermined cycle with reference to the map information in the mobile terminal 200.

With reference to FIG. 8, when the vehicle travels in the multipath region, conventionally, an error between a vehicle location trajectory (solid line) corrected by the mobile terminal 200 based on the location information transmitted from the vehicle terminal 100 and a vehicle location trajectory (dotted line) calculated by the vehicle terminal 100 increases cumulatively over time.

On the other hand, when the vehicle travels in the multipath region, the vehicle localization system 10 according to the present disclosure minimizes the location-related error by correcting the vehicle location into the location corrected by the mobile terminal 200 at a predetermined cycle.

Figure 9:
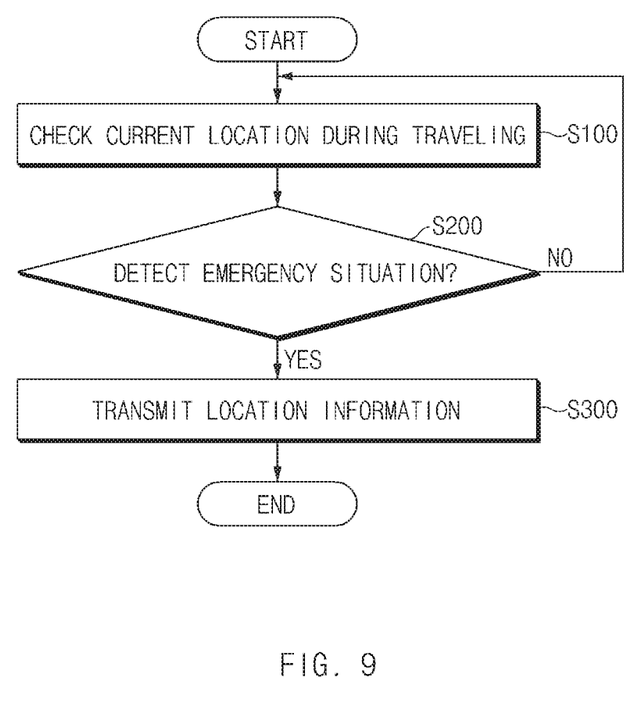
FIG. 9 is a flowchart showing an eCall service method according to the present disclosure.

FIG. 9 is a flowchart showing an eCall service method according to the present disclosure.

With reference to FIG. 9, the vehicle terminal 100 checks the current location of the vehicle in real time during traveling (S100). The vehicle terminal 100 measures the current location of the vehicle using the vehicle localization method shown in FIG. 6.

The vehicle terminal 100 detects the occurrence of the emergency situation through the vehicle sensor 140 (S200). The processor 160 of the vehicle terminal 100 determines whether the emergency situation has occurred using the data measured by the vehicle sensor 140. For example, upon detecting an operation of the air bag, the processor 160 determines that the emergency situation has occurred.

When the emergency situation is detected, the vehicle terminal 100 transmits the finally confirmed current location information of the vehicle to the control center 30 (S300). The processor 160 of the vehicle terminal 100 transmits the most recently updated vehicle location information to the control center 30 via the communication module no.

Figure 10:
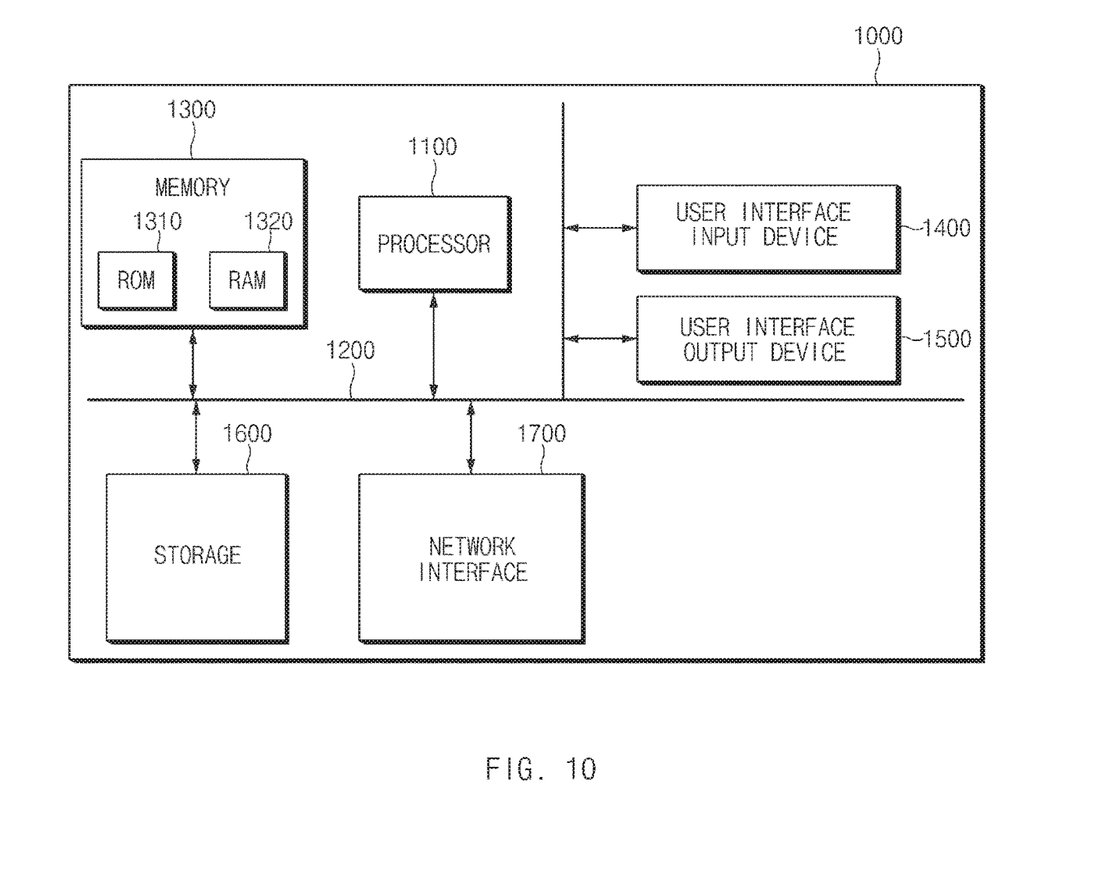
FIG. 10 is a block diagram illustrating a computing system that implements an eCall service method according to an embodiment of the present disclosure.

FIG. 10 is a block diagram illustrating a computing system that implements an eCall service method according to an embodiment of the present disclosure.

With reference to FIG. 10, a computing system 100 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the embodiments disclosed herein may be embodied directly in a hardware or a software module executed by the processor 1100, or in a combination thereof. The software module may reside on a storage medium (that is, the memory 1300 and/or the storage 1600) such as a RAM memory, a flash memory, a ROM memory, an EPROM memory, an EEPROM memory, a register, a hard disk, a removable disk, a CD-ROM. The exemplary storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure. Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

According to the present disclosure, location accuracy may be improved by measuring the vehicle location using the map information in the mobile terminal in the poor reception quality region where the reception of the satellite signal is difficult. Therefore, when the vehicle localization system according to the present disclosure is applied to an existing eCall system that does not have map information on its own, the eCall system may provide an accurate emergency situation occurrence location even when an emergency situation occurs in the poor reception quality region.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle localization system comprising: a mobile terminal configured to provide map information; and
   a vehicle terminal configured to calculate a current location of a vehicle using the map information when the vehicle enters a poor reception quality zone where a reception of a satellite signal is poor and to correct the current location of the vehicle based on the map information of the poor reception quality zone, wherein the map information of the poor reception quality zone includes a road attribute, a starting location, an ending location, and a road gradient of the poor reception quality zone;
   wherein the vehicle terminal includes:

a communication module configured to communicate with the mobile terminal; a location measurement module configured to measure a vehicle location using the satellite signal;

a dead reckoning module configured to estimate the vehicle location based on a travel distance and a heading angle of the vehicle; and a processor configured to receive map information of the poor reception quality zone from the mobile terminal and to correct the current location of the vehicle.

2. The vehicle localization system of claim 1, wherein the mobile terminal is configured to map-match a measured location and an estimated location included in the vehicle location information transmitted from the vehicle terminal onto an electronic map to select a current road-zone matching the poor reception quality zone where the vehicle is located.

3. The vehicle localization system of claim 2, wherein the mobile terminal is configured to extract map information of the selected current road-zone from the electronic map, and to transmit the map information of the selected current road-zone to the vehicle terminal.

4. The vehicle localization system of claim 1, wherein the processor is configured to determine the poor reception quality zone as a reception-disturbance region or a shadow region, based on the road attribute.

5. The vehicle localization system of claim 4, wherein the processor is configured to change the current location of the vehicle into a location map-matched by the mobile terminal when the poor reception quality zone is the reception-disturbance region.

6. The vehicle localization system of claim 5, wherein the processor is further configured to correct the current location of the vehicle based on estimated location-related error information calculated by the mobile terminal when the poor reception quality zone is the shadow region.

7. The vehicle localization system of claim 1, wherein the mobile terminal is configured to map-match a measured location and an estimated location included in the vehicle location information transmitted from the vehicle terminal onto an electronic map to select a current road-zone matching the poor reception quality zone where the vehicle is located.

8. The vehicle localization system of claim 7, wherein the mobile terminal is configured to extract map information of the selected current road-zone from the electronic map, and to transmit the map information of the selected current road-zone to the vehicle terminal.

9. A vehicle localization method comprising:
acquiring, by a vehicle terminal, location information of a vehicle;
transmitting, by the vehicle terminal, the acquired location information to a mobile terminal;
determining, by the vehicle terminal, whether the vehicle enters a poor reception quality zone where a reception of a satellite signal is poor;
receiving, by the vehicle terminal, map information of the poor reception quality zone transmitted from the mobile terminal when the vehicle has entered the poor reception quality zone, wherein the map information of the poor reception quality zone includes a road attribute,
a starting location, an ending location, and a road gradient of the poor reception quality zone; and
correcting, by the vehicle terminal, a current location of the vehicle using the map information of the poor reception quality zone;

wherein receiving the map information of the poor reception quality zone includes:
map-matching, by the mobile terminal, a measured location and an estimated location included in the location information onto an electronic map;
selecting, by the mobile terminal, a current road-zone matched with the poor reception quality zone where the vehicle is located, based on the map-matched location information;
extracting, by the mobile terminal, map information of the current road-zone from the electronic map; and
transmitting, by the mobile terminal, the extracted map information of the current road-zone to the vehicle terminal.

10. The vehicle localization method of claim 9, wherein the map-matching onto the electronic map includes calculating, by the mobile terminal, an error between the estimated location and the map-matched estimated location.

11. The vehicle localization method of claim 10, wherein the mobile terminal transmits the calculated error information together with the map information of the current road-zone.

12. The vehicle localization method of claim 11, wherein correcting the current location of the vehicle comprises correcting, by the vehicle terminal, the current location of the vehicle using the calculated error information.

13. A vehicle localization method comprising:
receiving, by a mobile terminal, the location information acquired by a vehicle terminal mobile terminal;
map-matching, by the mobile terminal, a measured location and an estimated location included in the location information onto an electronic map;
selecting, by the mobile terminal, a current road-zone matched with the poor reception quality zone where the vehicle is located, based on the map-matched location information;
extracting, by the mobile terminal, map information of the current road-zone from the electronic map;
transmitting, by the mobile terminal, the extracted map information of the current road-zone to the vehicle terminal;
receiving, by the vehicle terminal, map information of the poor reception quality zone transmitted from the mobile terminal when the vehicle has entered a poor reception quality zone where a reception of a satellite signal is poor, wherein the map information of the poor reception quality zone includes a road attribute, a starting location, an ending location, and a road gradient of the poor reception quality zone; and
correcting, by the vehicle terminal, a current location of the vehicle using the map information of the poor reception quality zone;
wherein correcting the current location of the vehicle includes correcting, by the vehicle terminal, the current location of the vehicle using the calculated error information;
wherein the map-matching onto the electronic map comprises calculating, by the mobile terminal, an error between the estimated location and the map-matched estimated location; and
wherein the mobile terminal transmits the calculated error information together with the map information of the current road-zone.

14. The vehicle localization method of claim 13, wherein the map-matching onto the electronic map comprises calculating, by the mobile terminal, an error between the estimated location and the map-matched estimated location.

15. The vehicle localization method of claim 14, wherein the mobile terminal transmits the calculated error information together with the map information of the current road-zone.

\* \* \* \* \*

UNITED STATES PATENT AND TRADEMARK OFFICE
CERTIFICATE OF CORRECTION

PATENT NO. : 10,883,840 B2  
APPLICATION NO. : 16/530021  
DATED : January 5, 2021  
INVENTOR(S) : Kim et al.

Page 1 of 1

It is certified that error appears in the above-identified patent and that said Letters Patent is hereby corrected as shown below:

On the Title Page

Item (73) Assignee, Line 2, delete "Cornoration" and insert --Corporation--.

Signed and Sealed this  
Sixteenth Day of February, 2021

Drew Hirshfeld  
*Performing the Functions and Duties of the*  
*Under Secretary of Commerce for Intellectual Property and*  
*Director of the United States Patent and Trademark Office*